US011683581B2

(12) United States Patent
Bang

(10) Patent No.: US 11,683,581 B2
(45) Date of Patent: Jun. 20, 2023

(54) IMAGE DISPLAYING APPARATUS AND METHOD THEREOF

(71) Applicant: LG ELECTRONICS INC., Seoul (KR)

(72) Inventor: Yousok Bang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/647,335

(22) Filed: Jan. 6, 2022

(65) Prior Publication Data

US 2022/0217284 A1 Jul. 7, 2022

(30) Foreign Application Priority Data

Jan. 7, 2021 (KR) .................. 10-2021-0002054

(51) Int. Cl.
*H04N 23/90* (2023.01)
*H04N 23/63* (2023.01)
*G06F 1/16* (2006.01)

(52) U.S. Cl.
CPC ......... *H04N 23/634* (2023.01); *G06F 1/1686* (2013.01); *H04N 23/90* (2023.01)

(58) Field of Classification Search
CPC ............ H04N 5/232941; H04N 5/247; H04N 5/23241; H04N 5/232; G06F 1/1686; G06F 21/83; G06F 21/84; G06F 1/1605; G06F 21/81
See application file for complete search history.

(56) References Cited

U.S. PATENT DOCUMENTS

| 8,612,788 | B2 | 12/2013 | Hsieh | |
|---|---|---|---|---|
| 2015/0363613 | A1 | 12/2015 | O'Dowd et al. | |
| 2018/0165472 | A1* | 6/2018 | Adams | G06F 21/83 |
| 2020/0226739 | A1* | 7/2020 | Honjo | G06F 17/18 |

FOREIGN PATENT DOCUMENTS

WO  2020117223  6/2020

OTHER PUBLICATIONS

European Patent Office Application Serial No. 22150164.6, Search Report dated Jun. 1, 2022, 11 pages.
Neagu, "How to configure and test the webcam in Skype," Digital Citizen, Apr. 25, 2019, 8 pages.

(Continued)

*Primary Examiner* — Mekonnen D Dagnew
(74) *Attorney, Agent, or Firm* — Lee Hong Degerman Kang & Waimey

(57) ABSTRACT

The present disclosure relates to an image displaying apparatus. The image displaying apparatus according to an embodiment of the present disclosure includes a first camera configured to acquire an image; a display; and a controller, wherein the controller checks a camera registered as a use target, outputs a screen including the acquired image through the display, when the first camera is registered as the use target, and outputs a screen indicating that a use of the first camera is impossible due to security through the display, when a second camera, which is a virtual device corresponding to the first camera, is registered as the use target. Further, various embodiments are possible.

15 Claims, 7 Drawing Sheets

(56) References Cited

OTHER PUBLICATIONS

Wu et al., "Security Threats to Mobile Multimedia Applications: Camera-Based Attacks on Mobile Phones," IEEE Communications Magazine, IEEE Service Center, Piscataway, US, vol. 52, No. 3, Mar. 2014, 8 pages.

Cai et al., "Defending Against Sensor-Sniffing Attacked on Mobile Phones," Proceedings of the 1st ACM Workshop on Networking, Systems, and Applications for Mobile Handhelds, Mobiheld, Jan. 2009, 6 pages.

* cited by examiner

IMAGE DISPLAYING APPARATUS AND METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2021-0002054, filed on Jan. 7, 2021, the contents of which are hereby incorporated by reference herein in its entirety.

BACKGROUND OF THE INVENTION

1. Field of the Disclosure

The present disclosure relates an image displaying apparatus and an operating method thereof.

2. Description of the Related Art

An image displaying apparatus is an apparatus having a function of displaying an image that a user can watch, and the user can watch various contents through the image displaying apparatus. For example, the image displaying apparatus may include a Television (TV) having a liquid crystal display (LCD) using liquid crystal, or having an OLED display using an organic light emitting diode (hereinafter, referred to as OLED), a notebook computer, and the like.

In recent years, as various components such as a camera and a microphone are provided in an image displaying apparatus, a user can use various components provided in the image displaying apparatus as needed. For example, a user may transmit an image captured by a camera provided in the image displaying apparatus or a voice recorded through a microphone to a server providing a streaming service, and a counterpart may receive the image or voice provided by the user in a streaming manner in real time. Through this, the user may conduct an online video conference with a specific counterpart, or may provide personal broadcasting to a large number of unspecified counterparts.

Meanwhile, in order to prevent an image or voice acquired through a camera or a microphone provided in the image displaying apparatus from leaking outside regardless of the user's intention and intruding upon privacy, the security function of the image displaying apparatus needs to be strengthened. Conventionally, a light incident on a camera is blocked or a portion of microphone to which a sound is input is blocked by simply using a physical configuration (e.g., a sticker), but there is a problem in that it is difficult to prevent the leakage of image or voice.

In addition, when a security mode is set, the power supply to a camera, or the like may be stopped to fundamentally block the generation of data. However, when a user forgets about setting of the security mode, or when the third user wants to use the camera, there is a possibility that it may be mistaken for a product defect of the image displaying apparatus, and this may cause unnecessary requests for repairs to the service center.

SUMMARY

It is an object of the present disclosure to solve the above and other problems.

It is another object of the present disclosure to provide an image display apparatus and method thereof that may prevent external leakage of image and/or voice, and reduce the possibility of a user's misunderstanding regarding product defects.

In accordance with an aspect of the present disclosure, an image displaying apparatus includes a first camera configured to acquire an image; a display; and a controller, wherein the controller checks a camera registered as a use target, outputs a screen including the acquired image through the display, when the first camera is registered as the use target, and outputs a screen indicating that a use of the first camera is impossible due to security through the display, when a second camera, which is a virtual device corresponding to the first camera, is registered as the use target.

In accordance with another aspect of the present disclosure, a method of operating an image displaying apparatus includes: checking a camera registered as a use target; outputting a screen including an acquired image through a display, when a first camera for acquiring an image is registered as the use target; and outputting, through the display, a screen indicating that use of the first camera is not possible due to security, when a second camera, which is a virtual device corresponding to the first camera, is registered as the use target.

The effect of the image displaying apparatus and the operation method thereof according to the present disclosure is as follows.

According to at least one embodiment of the present disclosure, it is also possible to reduce the possibility that a user may misrecognize as a defective product, while preventing the external leakage of image and/or voice when setting the security mode.

The additional range of applicability of the present disclosure will become apparent from the following detailed description. However, because various changes and modifications will be clearly understood by those skilled in the art within the spirit and scope of the present disclosure, it should be understood that the detailed description and specific embodiments such as preferred embodiments of the present disclosure are merely given by way of example.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION OF THE PREFERRED EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The suffixes "module" and "unit" in elements used in description below are given only in consideration of ease in preparation of the specification and do not have specific meanings or functions. Therefore, the suffixes "module" and "unit" may be used interchangeably.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

In addition, although the terms "first," "second," etc., may be used herein to describe various components, these components should not be limited by these terms. These terms are only used to distinguish one component from another component.

Figure 1A:
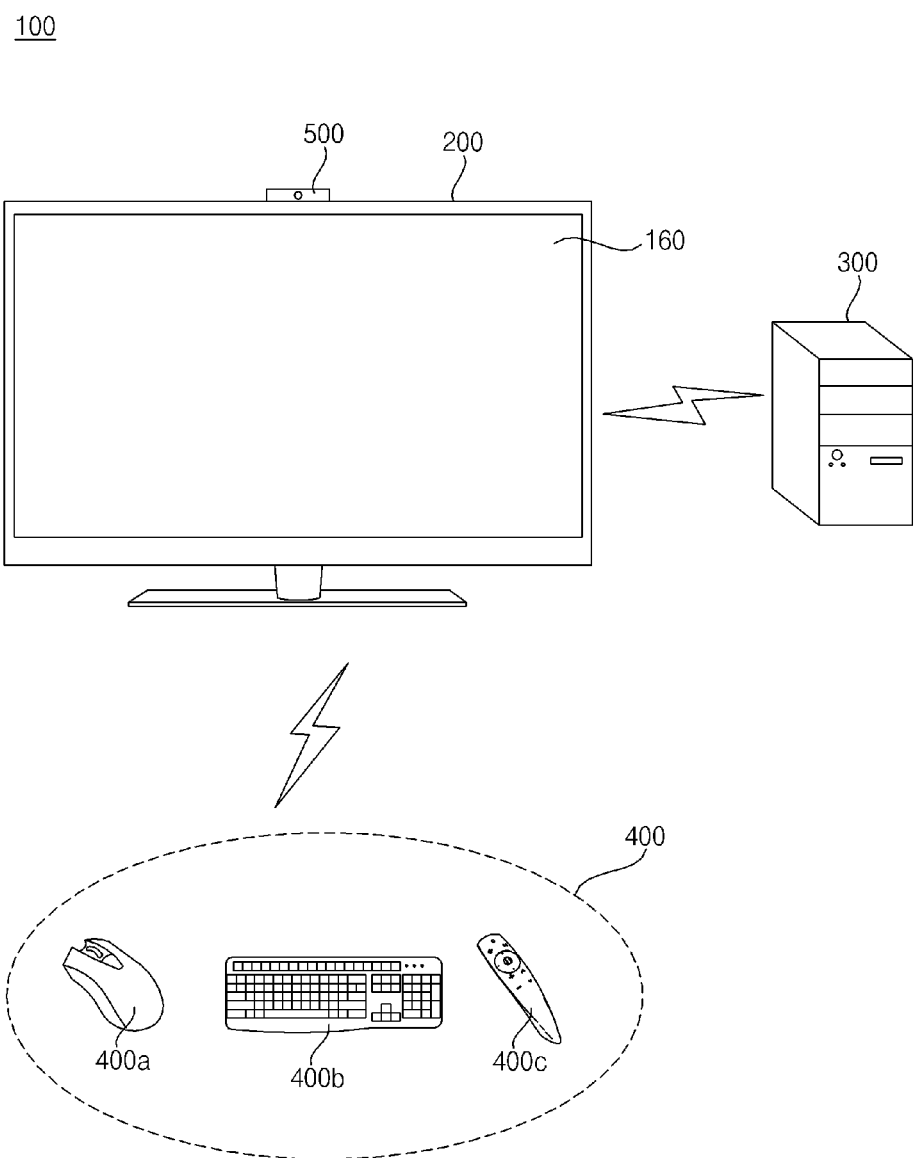
FIGS. 1A and 1B are diagrams illustrating an image displaying apparatus according to various embodiments of the present disclosure.
Figure 1B:
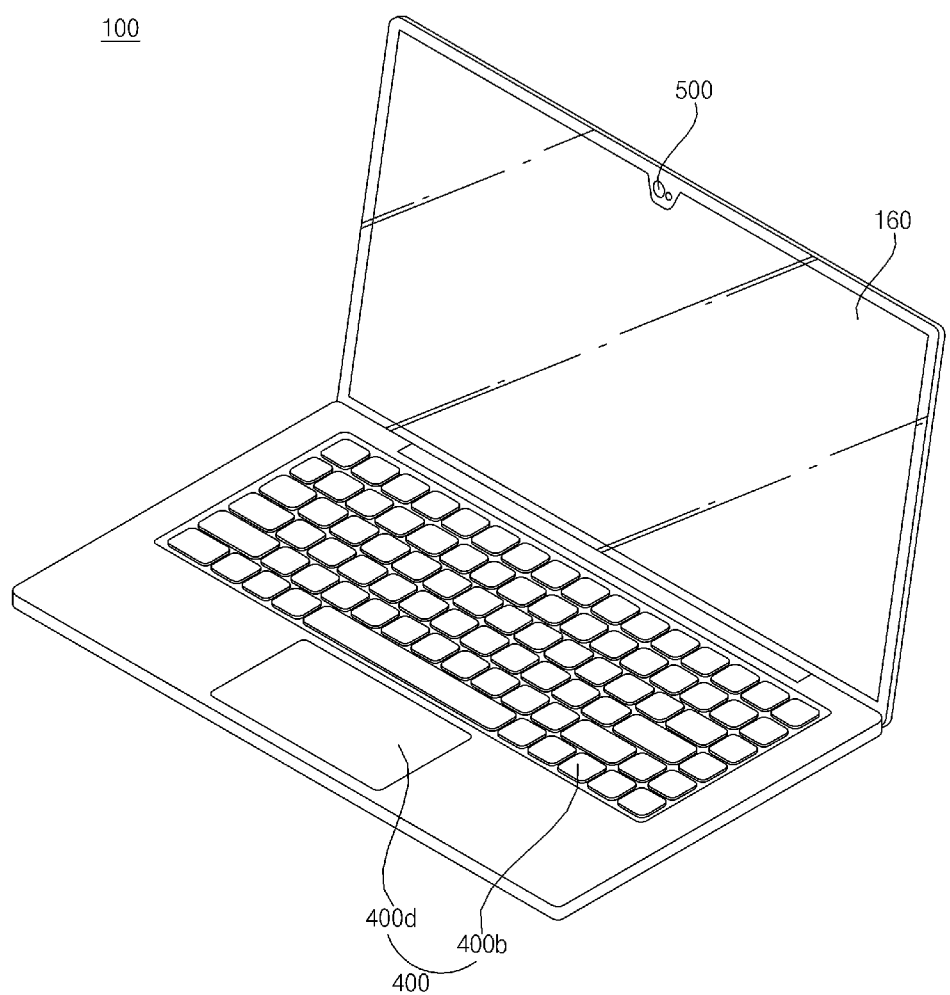

FIGS. 1A and 1B are diagrams illustrating an image displaying apparatus according to various embodiments of the present disclosure.

The image displaying apparatus 100 may be an apparatus that processes and outputs an image. The image displaying apparatus 100 is not particularly limited as long as it can output a screen on which an image is displayed, such as a television (TV), a notebook computer, a smart phone, and a tablet computer.

The image displaying apparatus 100 may receive and process a broadcast signal, and output a signal-processed broadcast image. When the image displaying apparatus 100 receives the broadcast signal, the image displaying apparatus 100 may correspond to a broadcast reception apparatus. In this case, the image displaying apparatus 100 may receive a broadcast signal wirelessly through an antenna, or may receive a broadcast signal by a wire through a cable. For example, the image displaying apparatus 100 may receive a terrestrial broadcast signal, a satellite broadcast signal, a cable broadcast signal, an Internet Protocol Television (IPTV) broadcast signal, and the like.

Referring to FIG. 1A, the image displaying apparatus 100 may include a display apparatus 200, a processing apparatus 300, and/or a remote control apparatus 400. The image displaying apparatus 100 may further include a camera 500 for acquiring an image.

The display apparatus 200 may include a display 160 and may output an image based on an image signal received from the processing apparatus 300. For example, the display apparatus 200 may store an image received from the processing apparatus 300, and output the stored image according to the screen size of the display apparatus 200 and the number of frames that can be displayed per second.

The display apparatus 200 is not particularly limited as long as it can output a screen corresponding to an image signal, such as a TV, a monitor, or a projector.

The processing apparatus 300 is not particularly limited as long as it can transmit a signal including RGB data corresponding to an image to the display apparatus 200, such as a computer.

The remote control apparatus 400 may be connected to the display apparatus 100 and/or the processing apparatus 300 in a wired/wireless manner to provide various control signals. In this case, the remote control apparatus 400 may include an apparatus that establishes a wired/wireless network with the display apparatus 100 and/or the processing apparatus 300, and transmits various control signals through the established network, or receives signals related to various operations.

For example, various input apparatuses such as a mouse 400a, a keyboard 400b, a space remote control 400c, a trackball, a joystick, and the like may be used as the remote control apparatus 400. The remote control apparatus 400 may be named as an external device, an input apparatus, an input unit, and the like, and hereinafter, it is clarified beforehand that it may be used interchangeably as needed.

Referring to FIG. 1B, the image displaying apparatus 100 may be an electronic apparatus including a display 160, a processing apparatus (e.g., the processing apparatus 300 of FIG. 1A), an input apparatus 400 and/or a camera 500.

For example, the image displaying apparatus 100 may be a notebook computer including all of a display 160, a keyboard 400b, a touchpad 400d, and a camera 500.

Figure 2:
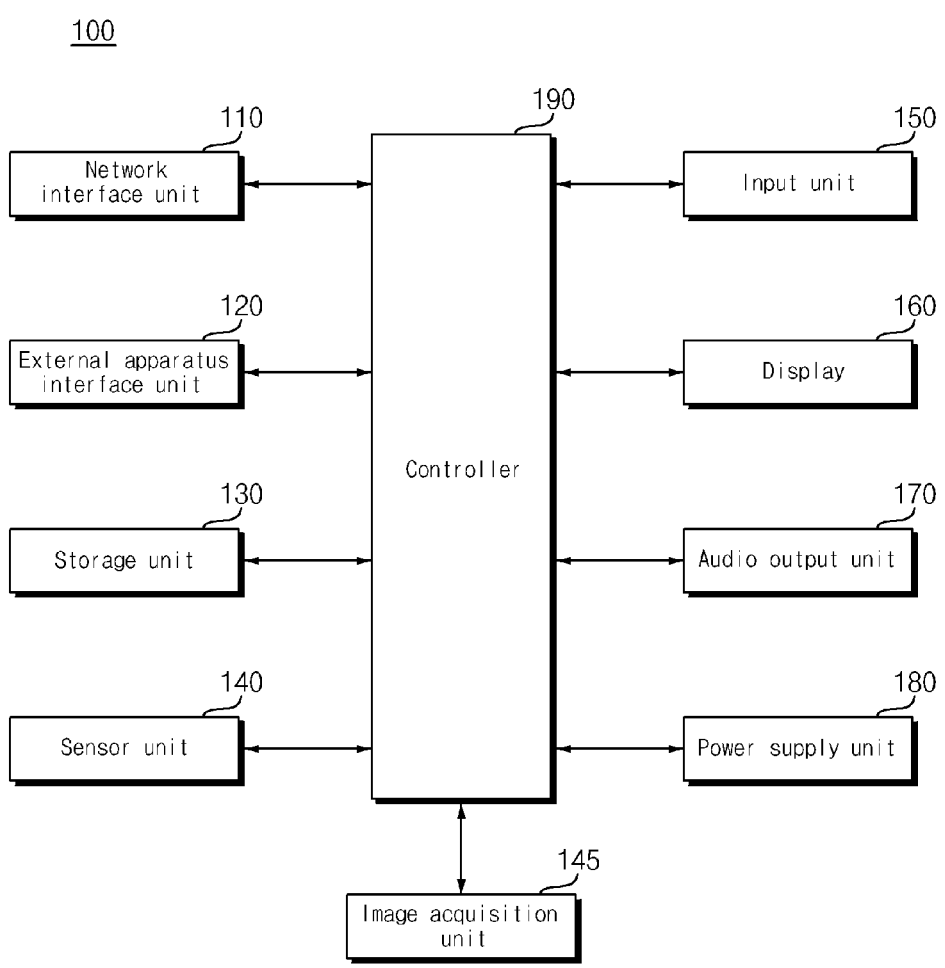
FIG. 2 is an example of an internal block diagram of the image displaying apparatus of FIG. 1.

FIG. 2 is an example of an internal block diagram of the image displaying apparatus of FIG. 1.

Referring to FIG. 2, the image displaying apparatus 100 may include a network interface unit 110, an external apparatus interface unit 120, a storage unit 130, a sensor unit 140, an image acquisition unit 145, an input unit 150, a display 160, an audio output unit 170, a power supply unit 180, and/or a controller 190.

The network interface unit 110 may provide an interface for connecting the image displaying apparatus 100 to a wired/wireless network including an Internet network. For example, the network interface unit 110 may receive content or data provided by the Internet, a content provider, or a network operator, through a connected network.

Meanwhile, the network interface unit 110 may include a communication module (not shown) for connection with a wired/wireless network.

The external apparatus interface unit 120 may transmit or receive data to or from a connected external apparatus. To this end, the external apparatus interface unit 120 may include an A/V input/output unit (not shown).

The external apparatus interface unit 120 may be connected to an external apparatus such as a Digital Versatile Disk (DVD), Blu-ray, game apparatus, camera, smart phone by wire/wireless, and may perform input/output operation with the external apparatus.

In addition, the external apparatus interface unit 120 may establish a communication network with various remote control apparatuses 200 as shown in FIGS. 1A and 1B, and may receive a control signal related to the operation of the image displaying device 100 from the remote control apparatus 200, or transmit data related to the operation of the image displaying apparatus 100 to the remote control apparatus 200.

The A/V input/output unit may receive image and voice signals from an external apparatus.

The external apparatus interface unit 120 may include a wireless communication unit (not shown) for short-range wireless communication with other electronic apparatus. Through such a wireless communication unit (not shown), the external apparatus interface unit 120 may exchange data with an adjacent mobile terminal through short-range wireless communication.

The storage unit 130 may store a program for processing and controlling each signal in the controller 190, and may store a signal-processed image, voice, or data signal.

For example, the storage unit 130 may store application programs designed for the purpose of performing various tasks that can be processed by the controller 190, and upon request of the controller 190, selectively provide some of the stored application programs.

The program stored in the storage unit 130 is not particularly limited as long as it can be executed by the controller 190.

FIG. 2 illustrates an embodiment in which the storage unit 130 is provided separately from the controller 190, but the scope of the present disclosure is not limited thereto, and at least a portion of the storage unit 130 may be included in the controller 190.

The storage unit 130 may include at least one of a volatile memory (e.g., DRAM, SRAM, SDRAM, etc.), a non-volatile memory (e.g., a flash memory), a hard disk drive (HDD), and a solid state drive (SSD).

The sensor unit 140 may measure a physical quantity or detect an operating state of the image displaying apparatus 100 to convert the measured or detected information into an electrical signal.

The sensor unit 140 may include a proximity sensor, a temperature/humidity sensor, an illuminance sensor, and the like.

The image acquisition unit 145 may acquire an image around the image displaying apparatus 100. For example, the image acquisition unit 145 may include at least one camera (e.g., the camera 500 of FIG. 1B).

At least one camera 500 included in the image acquisition unit 145 may be a digital camera. The digital camera may include at least one optical lens, an image sensor (e.g., CMOS image sensor) configured to include a plurality of photodiodes (e.g., pixel) on which an image is formed by light passing through the optical lens, and a digital signal processor (DSP) that configures an image based on a signal output from the photodiodes. The digital signal processor may generate a moving image formed of frames composed of still images, as well as a still image.

The image acquired through the image acquisition unit 145 may be stored in the storage unit 130. The image acquired through the image acquisition unit 145 may be transmitted to the controller 190.

The input unit 150 may include an input apparatus (e.g., a key, a touch panel, etc.) capable of receiving a user input. The input unit 150 may include an input apparatus provided in the remote control apparatus 400.

The input unit 150 may include at least one microphone. The microphone may receive a sound, and may transmit a signal corresponding to the received sound to the controller 190.

The input unit 150 may receive a user input through an input apparatus, and may transmit a command corresponding to the received user input to the controller 190.

The display 160 may convert an image signal, a data signal, an OSD signal, and a control signal processed by the controller 190, or an image signal, a data signal, and a control signal received from the external apparatus interface unit 120 to generate a driving signal.

The display 160 may include a display panel (not shown) including a plurality of pixels.

The plurality of pixels provided in the display panel may include a RGB sub-pixel. Alternatively, the plurality of pixels included in the display panel may include a RGBW sub-pixel. The display 160 may convert an image signal, a data signal, an OSD signal, a control signal, etc. processed by the controller 190 to generate a driving signal for a plurality of pixels.

The display 160 may be a plasma display panel (PDP), a liquid crystal display (LCD), an organic light emitting diode (OLED), a flexible display, and the like, and may also be a three-dimensional (3D) display. The 3D display may be divided into a glasses-free type and a glasses type.

Meanwhile, the display 160 may be configured as a touch screen and used as an input apparatus in addition to an output apparatus.

The audio output unit 170 may include an audio apparatus such as a speaker and a buzzer, and may receive a signal processed by the controller 190 and output it as a voice. In addition, the voice signal processed by the controller 190 may be input to an external audio apparatus through the external apparatus interface unit 120.

The power supply unit 180 may supply power to all components included in the image displaying apparatus 100. In particular, power may be supplied to the controller 190, the display 160, and the audio output unit 170, which may be implemented in the form of a system on chip (SOC).

The power supply unit 180 may include a converter (not shown) that converts AC power into DC power, a Dc/Dc converter (not shown) that converts the level of DC power, and the like.

The controller 190 may be connected to each component provided in the image displaying apparatus 100. The controller 190 may, for example, transmit/receive signals to/from each component included in the image displaying apparatus 100 and may control the overall operation of each component.

The controller 190 may include at least one processor, and may control the overall operation of the image displaying apparatus 100 by using the at least one processor. Here, the processor may be a general processor such as a central processing unit (CPU). Obviously, the processor may be a dedicated device such as an ASIC or other hardware-based processor.

When the controller 190 includes a plurality of processors, the plurality of processors may be integrated on one chip or may be physically separated from each other.

The controller 190 may generate at least one virtual device. Here, the virtual device may refer to an apparatus which is configured and generated in software by using a resource of the image displaying apparatus 100, with respect to a configuration that is a generation target, for example, a memory, a communication module, a camera 500, a microphone, and the like. For example, when the camera 500 is determined as a generation target, the controller 190 may use the resource of the image displaying apparatus 100 to configure a driver, an interface, and the like for controlling input/output of signals with respect to a virtual device (hereinafter, a virtual camera) that is generated in correspondence with the camera 500.

The controller 190 may determine a configuration that is a use target, among a plurality of configurations, and may register the determined configuration. For example, the controller 190 may determine a camera 500 that is a use target, among the plurality of cameras 500, and may register the determined camera 500. In this case, the controller 190 may control the power to be supplied to the camera 500 that is a use target, and may block the supply of power to the camera 500 that is not a use target.

The controller 190 may check a configuration registered as a use target. For example, the controller 190 may check a microphone registered as a use target, among the plurality of microphones. In this case, the controller 190 may control the microphone registered as a use target to receive a voice.

Meanwhile, the block diagram of the image displaying apparatus 100 shown in FIG. 2 is just a block diagram for an embodiment of the present disclosure, and each component of the block diagram may be incorporated, added, or omitted according to the specifications of the image displaying apparatus 100 actually implemented.

That is, two or more components may be combined into one component, or one component may be subdivided into two or more components as needed. In addition, the function performed by each block is for explaining the embodiment of the present disclosure, and the specific operation or apparatus does not limit the scope of the present disclosure.

Figure 3:
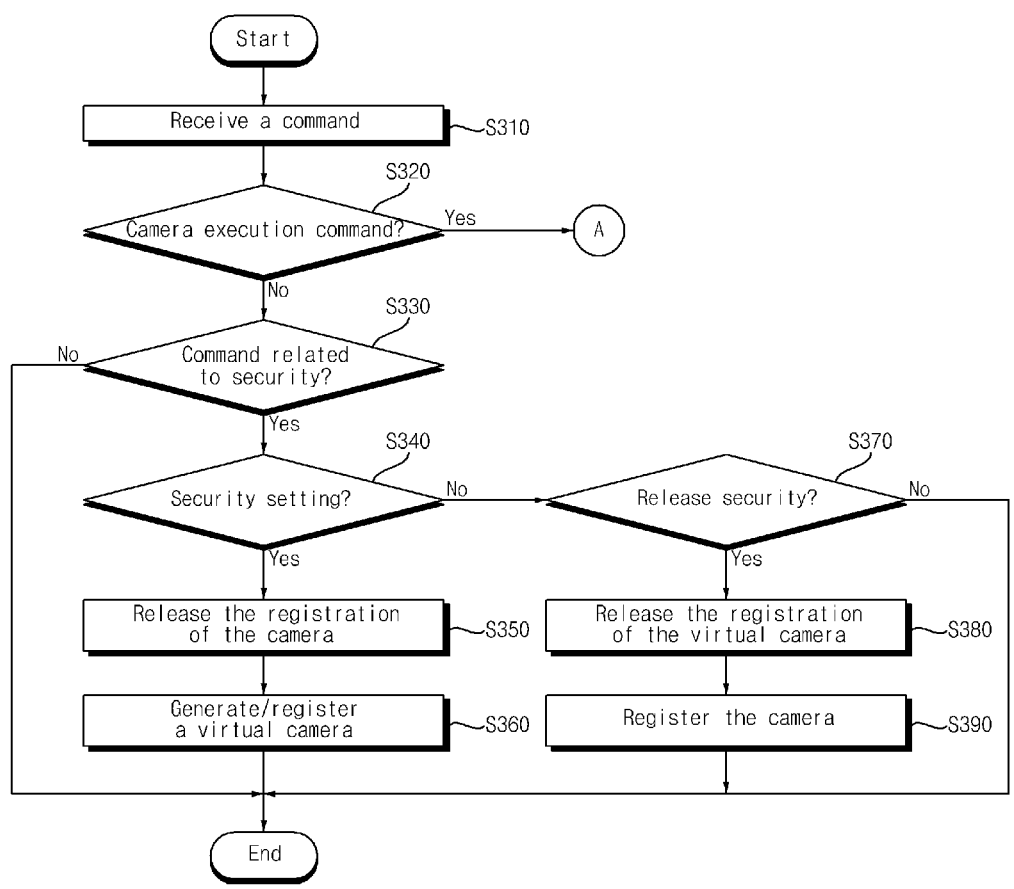
FIGS. 3 and 4 are flowcharts of a method of operating an image displaying apparatus according to an embodiment of the present disclosure.
Figure 4:
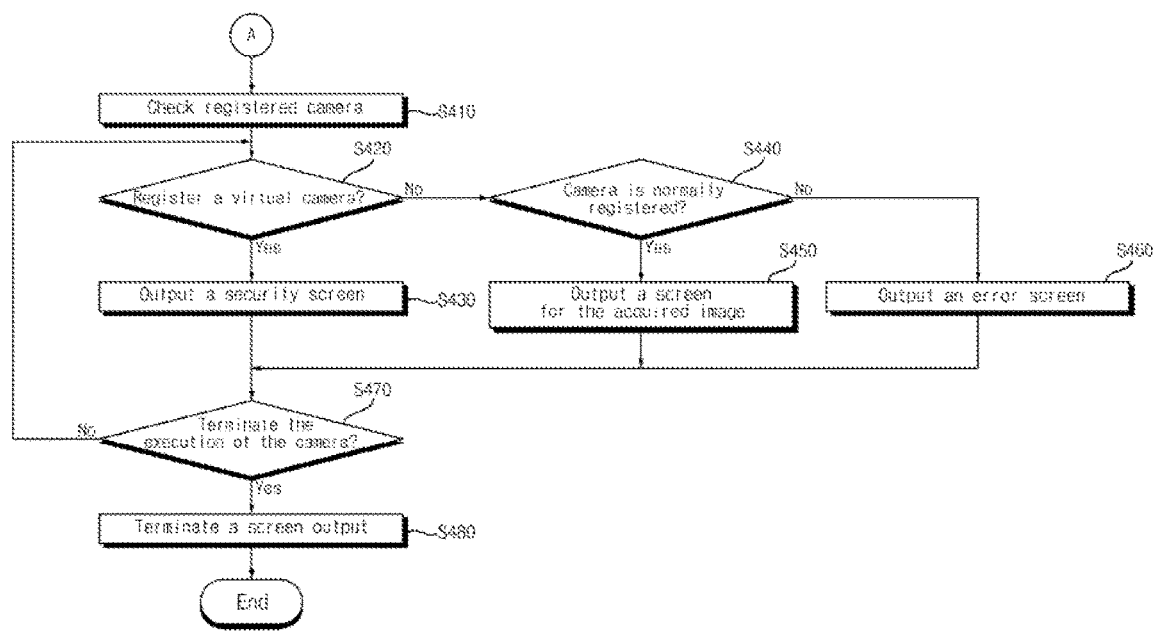
Figure 5:
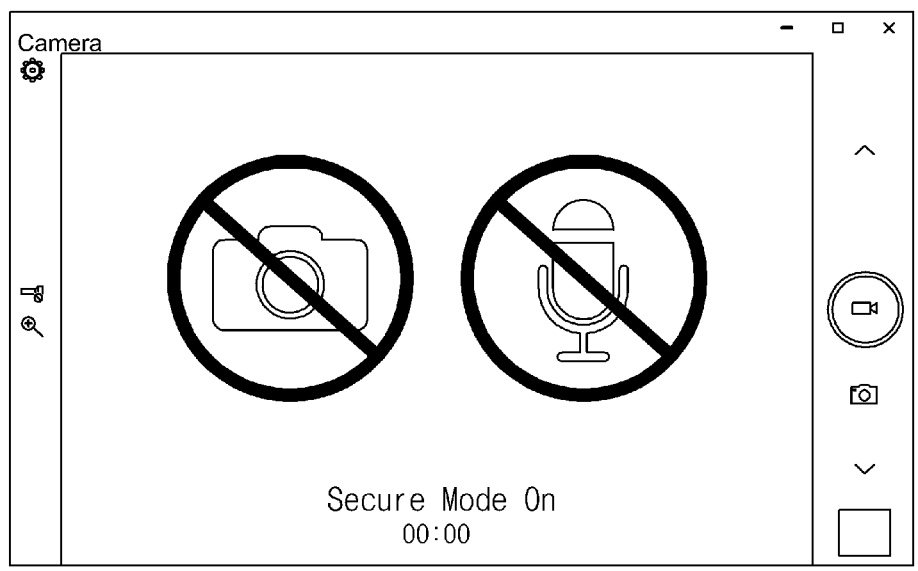
FIGS. 5 to 7 are diagrams for explaining the operation of the image displaying apparatus.
Figure 6:
Figure 7:
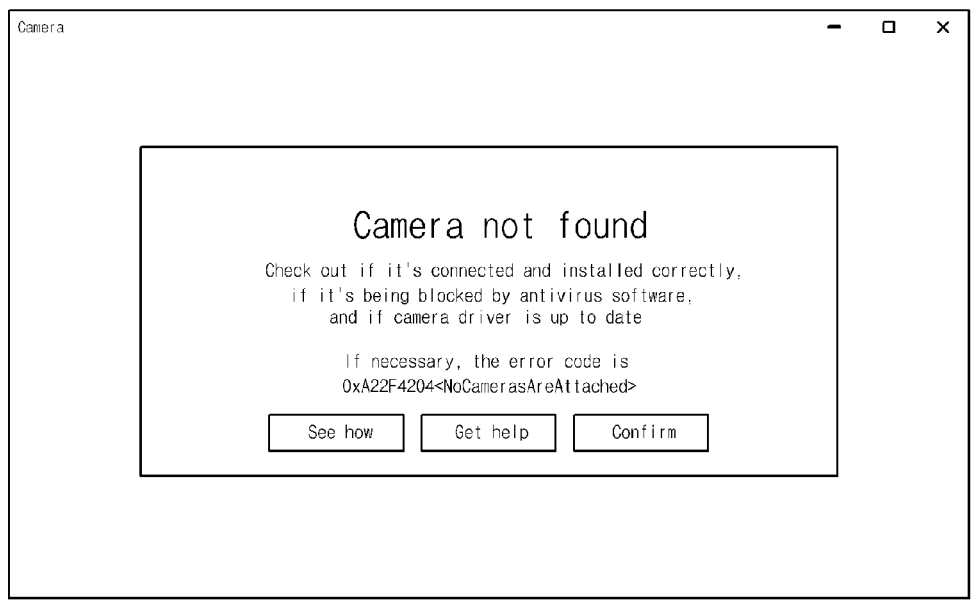

FIGS. 3 and 4 are flowcharts of a method of operating an image displaying apparatus according to an embodiment of the present disclosure, and FIGS. 5 to 7 are diagrams for explaining the operation of the image displaying apparatus.

Referring to FIG. 3, the image displaying apparatus 100 may receive a command corresponding to a user's input through the input unit 150, in operation S310.

The image displaying apparatus 100 may check whether the received command is a command corresponding to the execution of the camera 500, in operation S320. For example, when a command for executing an application using a function of the camera 500 is received through the input unit 150, the image displaying apparatus 100 may determine that the received command is a command corresponding to the execution of the camera 500.

In operation S330, when the received command is not a command corresponding to the execution of the camera 500, the image displaying apparatus 100 may determine whether the received command is a command related to security of the image displaying apparatus 100. For example, when a command for setting the mode of the image displaying apparatus 100 to a security mode, a command for releasing the security mode, and the like are received by a user through the input unit 150, the image displaying apparatus 100 may determine that a security-related command is received.

In operation S340, when the received command is a command related to the security of the image displaying apparatus 100, the image displaying apparatus 100 determines whether the command for setting the mode of the image displaying apparatus 100 to a security mode is received.

In operation S350, when the command for setting the mode of the image displaying apparatus 100 to a security mode is received, the image displaying apparatus 100 may release the registration of the camera 500 registered as a use target. In this case, the image displaying apparatus 100 may block the power supply to the camera 500, when the use registration for the camera 500 is released.

The image displaying apparatus 100 may generate a virtual camera that is a virtual device corresponding to the camera 500, and register the generated virtual camera as a camera that is a use target, in operation S360.

Meanwhile, in operation S370, when the received command is not the command for setting the mode of the image displaying apparatus 100 to a security mode, the image displaying apparatus 100 may determine whether a command for releasing the security mode is received.

In operation S380, when the command for releasing the security mode is received, the image displaying apparatus 100 may release the registration of the virtual camera registered as a use target. For example, when the use registration for the virtual camera is released, the image displaying apparatus 100 may delete data corresponding to the virtual camera so that resource is no longer allocated to the virtual camera configured in software.

The image displaying apparatus 100 may register the camera 500 as a use target, in operation S390. At this time, when the camera 500 is registered as a use target, the image displaying apparatus 100, may supply power to the camera 500, and may reactivate a driver, an interface, and the like that control the input and output of a signal for the camera 500.

Meanwhile, referring to FIG. 4, in operation S410, when the received command is a command corresponding to the execution of the camera 500, the image displaying apparatus 100 may check a camera registered as a use target.

In operation S420, the image displaying apparatus 100 may determine whether a camera registered as a use target is a virtual camera. For example, the image displaying apparatus 100 may determine whether the camera registered as a use target is a virtual camera, by checking an interface of the camera registered as a use target.

In operation S430, when the camera registered as a use target is a virtual camera, the image displaying apparatus 100 may output a preset screen (hereinafter, referred to as a security screen) in response to the security mode, through the display 160.

Referring to FIG. 5, when the camera registered as a use target is a virtual camera, a security screen indicating that the camera 500 and/or the microphone cannot be used may be output through the display 160.

Referring again to FIG. 4, in operation S440, when the camera registered as a use target is a camera 500 that is not a virtual camera, the image displaying apparatus 100 may determine whether the camera 500 is normally registered as a use target. For example, the image displaying apparatus 100 may determine whether a driver, an interface, or the like of the camera 500 operates normally so that the camera 500 can be used.

In operation S450, when the camera 500 is normally registered as a use target, the image displaying apparatus 100 may acquire an image through the camera 500, and output a screen for the acquired image through the display 160.

Meanwhile, in operation S460, when the camera 500 is not normally registered as a use target, for example, when the interface of the camera 500 does not operate normally, the image displaying apparatus 100 may output a screen related to an operation error of the camera 500 through the display 160.

Referring to FIG. 6, when the camera 500 is normally registered as a use target, an image including a user positioned in front of the display 160 that the camera 500 looks at may be acquired through the camera 500, and a screen including the acquired image may be output through the display 160.

Meanwhile, referring to FIG. 7, when the camera 500 is not normally registered as a use target, a screen including a message instructing to check the connection state of the camera 500, the state of the driver of the camera 500, and the like may be output through the display 160.

Referring again to FIG. 4, in operation S470, the image displaying apparatus 100 may determine whether the execution of the camera registered as a use target is terminated. For example, the image displaying apparatus 100 may determine whether a command for terminating the execution of the camera is received through the input unit 150.

When the execution of the camera is not terminated, the image displaying apparatus 100 may branch to operation S420, and output a screen corresponding to the camera registered as a use target through the display 180.

The image displaying apparatus 100 may terminate a screen output through the display 180, when the execution of the camera is terminated, in operation S480.

As described above, according to at least one embodiment of the present disclosure, when setting the security mode for the image displaying apparatus 100, it is also possible to reduce the possibility that a user may misrecognize as a defective product, while preventing the external leakage of image and/or voice.

It should be understood that the accompanying drawings are only for easy understanding of the embodiment disclosed in the present specification, and the accompanying drawings do not limit the technical concept disclosed in the present specification, but include all changes, equivalents, or substitutes included in the concept and scope of the present disclosure.

Meanwhile, the method of operating an image displaying apparatus of the present disclosure can be implemented as a processor-readable code on a recording medium readable by a processor included in the compressor driving device and the home appliance. The processor-readable recording medium includes all kinds of recording apparatuses in which data that can be read by the processor is stored. Examples of the recording medium readable by the processor include a ROM, a RAM, a CD-ROM, a magnetic tape, a floppy disk, an optical data storage device, and the like, and may also be implemented in the form of a carrier wave such as transmission over the Internet. In addition, the processor-readable recording medium may be distributed over network-connected computer systems so that code readable by the processor in a distributed fashion can be stored and executed.

While the present disclosure has been particularly shown and described with reference to exemplary embodiments thereof, it will be understood by those of ordinary skill in the art that various changes in form and detail may be made herein without departing from the spirit and scope of the present disclosure as defined by the following claims and such modifications and variations should not be understood individually from the technical idea or aspect of the present disclosure.

What is claimed is:

1. An image displaying apparatus comprising:
    a camera configured to capture an image;
    a display; and
    a controller configured to:
        determine a virtual camera as a configuration to be used for acquiring an image based on setting a security mode, wherein the virtual camera is configured in software using a resource of the image displaying apparatus,
        determine the camera as the configuration based on releasing the security mode,
        cause the display to display a first screen including the image acquired through the camera based on the camera being determined as the configuration, and
        cause the display to display a second screen indicating that a use of the camera is not available due to security based on the virtual camera being determined as the configuration.

2. The image displaying apparatus of claim 1, wherein the controller is further configured to cause a power supply to the camera to be blocked based on the virtual camera being determined as the configuration.

3. The image displaying apparatus of claim 1, wherein the controller is configured to:
    generate the virtual camera configured in software based on receiving a first command corresponding to the setting the security mode,
    delete data corresponding to the virtual camera based on receiving a second command corresponding to the releasing the security mode, and
    check which of the camera and the virtual camera is determined as the configuration based on receiving a third command corresponding to executing the camera.

4. The image displaying apparatus of claim 1, wherein based on a mode of the image displaying apparatus being set to the security mode, the controller is further configured to:
    release a registration for the configuration,
    generate the virtual camera in correspondence with the camera, and
    register the virtual camera as the use target configuration.

5. The image displaying apparatus of claim 4, wherein based on the virtual camera being generated, the controller is further configured to configure a driver and an interface to control an input signal and an output signal with respect to the virtual camera.

6. The image displaying apparatus of claim 4, wherein based on the security mode being released, the controller is further configured to release the registration for the configuration and to register the camera as the configuration.

7. The image displaying apparatus of claim 1, wherein the controller is further configured to:
    determine whether the camera operates normally based on the determination that the camera is determined as the configuration,
    cause the display to display the first screen based on a determination that the camera operates normally, and
    cause the display to display a third screen related to an operation error of the camera based on a determination that the camera does not operate normally.

8. The image displaying apparatus of claim 7, wherein the third screen related to the operation error includes an instruction message to check an operation state of the camera.

9. A method of operating an image displaying apparatus, the method comprising:
    determining a virtual camera as a configuration to be used for acquiring an image based on setting a security mode, wherein the virtual camera is configured in software using a resource of the image displaying apparatus;
    determining a camera of the image displaying apparatus as the configuration based on releasing the security mode;
    outputting a first screen including an image acquired through the camera through a display of the image displaying apparatus based on the camera being determined as the configuration; and
    outputting a second screen indicating that use of the camera is not available due to security based on the virtual camera being determined as the configuration.

10. The method of claim 9, further comprising:
    generating the virtual camera configured in software based on receiving a first command corresponding to the setting the security mode;
    deleting data corresponding to the virtual camera based on receiving a second command corresponding to the releasing the security mode; and
    checking which of the camera and virtual camera is determined as the configuration based on receiving a third command corresponding to executing the camera.

11. The method of claim 10, wherein determining the virtual camera as the configuration comprises:
    releasing a registration for the configuration;
    generating the virtual camera in correspondence with the camera; and
    registering the virtual camera as the configuration.

12. The method of claim 11, wherein generating the virtual camera comprises:
   configuring a driver and an interface that control input/output of signal with respect to the virtual camera.

13. The method of claim 10, wherein determining the camera as the configuration comprises:
   releasing a registration for the configuration; and
   registering the camera as the configuration.

14. The method of claim 9, wherein outputting the first screen comprises:
   determining whether the camera operates normally based on the determination that the camera is determined as the configuration;
   outputting the first screen including the acquired image through the display based on a determination that the camera operates normally; and
   outputting a third screen related to an operation error of the camera through the display based on a determination that the camera does not operate normally.

15. The method of claim 14, wherein the third screen related to the operation error includes a message instructing to check a state of the camera.

\* \* \* \* \*